United States Patent [19]

Marmon

[11] 4,437,487
[45] Mar. 20, 1984

[54] LIGHTNING PROTECTED CHECK-TYPE DRAIN VALVE

[75] Inventor: Frank E. Marmon, Marietta, Ga.

[73] Assignee: Lockheed Corporation, Burbank, Calif.

[21] Appl. No.: 297,712

[22] Filed: Aug. 31, 1981

[51] Int. Cl.³ .................................. F16K 43/00
[52] U.S. Cl. ...................... 137/322; 137/329.4; 141/351; 222/501; 244/135 R; 251/144; 251/149.6; 251/339
[58] Field of Search ............... 137/320, 322, 38, 78.5, 137/81.1, 509, 522, 528, 538, 329.1, 329.2, 329.4, 614.11, 614.19, 454.5; 141/294, 351, 354; 244/135 R; 251/339, 144, 149.6; 222/501

[56] References Cited

U.S. PATENT DOCUMENTS

| | | | |
|---|---|---|---|
| 2,796,882 | 6/1957 | Bradley | 137/329.4 |
| 3,022,797 | 2/1962 | Allin | 251/144 |
| 3,026,897 | 3/1962 | Derrington et al. | 251/144 |
| 3,103,341 | 9/1963 | Moran | 251/144 |
| 3,112,763 | 12/1963 | Tennis et al. | 137/509 |
| 3,145,968 | 8/1964 | Marx | 251/144 |
| 3,610,572 | 10/1971 | Swearingen | 251/144 |
| 3,698,420 | 10/1972 | Grundy et al. | 251/144 |
| 3,703,189 | 3/1972 | Koller | 251/144 |

FOREIGN PATENT DOCUMENTS 1348654  3/1974  United Kingdom ............... 137/322

Primary Examiner—George L. Walton
Attorney, Agent, or Firm—John J. Sullivan

[57] ABSTRACT

A drain valve assembly is mounted in the bottom of a fuel tank (10) to allow draining of condensate. The tank (10) is drained of fluid by the use of a tool (27) pushed upward against the piston (18) of the valve assembly separating it from its seat (15) in the valve housing (12) allowing liquid which has entered the housing (12) from the tank (10) through openings (16) to exit around the periphery of the unseated valve. If the valve assembly base is struck by lightning, a blast pressure occurs that can drive the poppet of a standard valve open allowing the electrical energy to enter the tank (10) causing a potential explosion. With the present valve assembly the pressure is allowed to pass through passage (20) in the piston (18) to apply a closing force on the surfaces (21, 22) and the inner end of the piston (18) which is greater than the opening force due to the area difference and the valve assembly remains closed.

6 Claims, 4 Drawing Figures

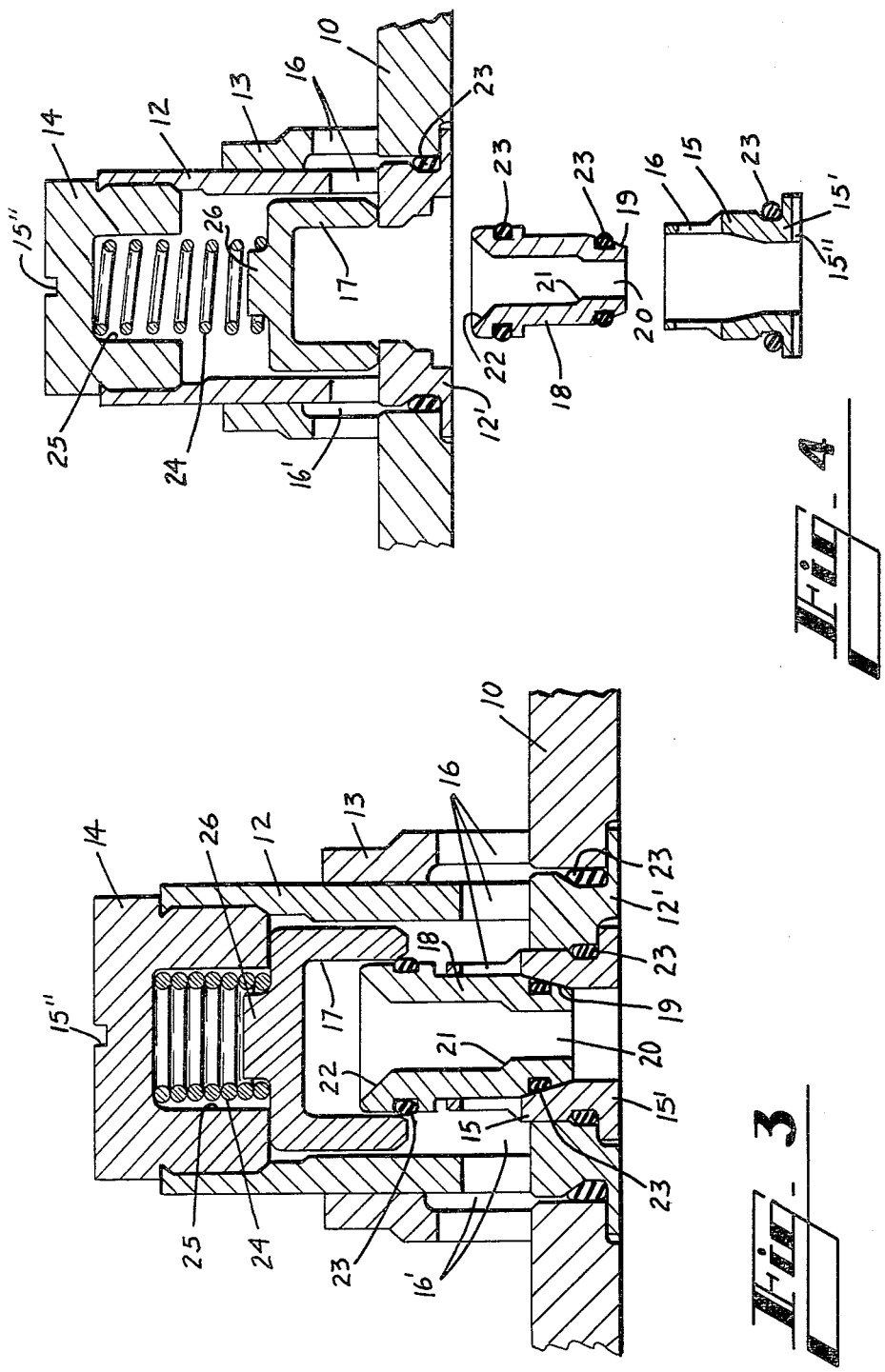

LIGHTNING PROTECTED CHECK-TYPE DRAIN VALVE

TECHNICAL FIELD

This invention relates to drain valves generally, and more particularly to check-type drain valves such as those commonly employed on aircraft fuel tanks.

In the normal operation of the aircraft, moisture collects in the fuel tanks and subsequently condenses or liquifies and settles to the bottom of the tank because of its heavier specific gravity compared to the fuel in the tank. Periodically, as a part of ground service and maintenance of the aircraft this water is removed from each tank through so-called "condensate" drain valves provided therefor in the bottom of the tank. Check-type drain valves have been employed for this purpose which are normally opened temporarily while the water is being drained and then closed or allowed to close under the normal action of a spring which holds the valve in the fully closed position.

In order to prevent the accidental opening of this condensate drain valve, notably under the forces and/or pressures accompanying a lightning strike of the aircraft special locks or locking devices have been employed to secure the valve in the closed position. These require the positive act of a serviceman or mechanic and are, therefore, subject to omission due to human error and can prove disastrous.

BACKGROUND ART

Typical of the drain valve prior art is U.S. Pat. No. 3,879,013 which discloses a drain boss which is capped off with a drain plug holding a poppet type valve open. When the drain plug is removed, the poppet closes to minimize fuel spillage. A separate hose or fitting is then threaded into the boss (where the plug was removed) which unseats the poppet and allows drainage. With the plug removed the valve becomes a standard push to drain type valve.

U.S. Pat. No. 3,026,897 discloses a standard type push to drain valve which can be pushed without removing a plug as in the above-mentioned patent. It also incorporates a hold open feature by threading the poppet to the cap and a feature whereby the primary seat may be replaced.

U.S. Pat. No. 3,703,189 also discloses a standard type push to drain valve. It features a design whereby the primary seat is removed by the poppet being lowered through the opening but not being completely removed.

None of the above prior art patents include any provisions for preventing accidental or inadvertent valve opening as for example by a blast force such as would be caused by lightning strikes. So far as is known the prior art is devoid of any better teaching in this regard.

Also in the general area of technology of the present invention and which may be of interest are the following U.S. patents:

U.S. Pat. No. 3,103,341 issued to Moran on Sept. 10, 1963

U.S. Pat. No. 882,170 issued to Schmidt on Mar. 17, 1908

U.S. Pat. No. 3,601,147 issued to Myers on Aug. 24, 1971.

Moran discloses a mechanically operated valve mounted externally on the tank and when opened by a screw device allows fluid to enter a chamber then into the hollow center portion of a rod. The rod is designed to allow a drain line to be attached to discharge the fluid.

Schmidt discloses a carburetor which incorporates a valve with two seats and flow passages through the valve to allow an air/gas mixture to pass to the upper seat area. When the valve is activated by the throttle, the air/gas mixture passes to the engine past both seats thereby suppling more mixture to the engine.

Myers discloses a semi-balanced valve with two seats similar to Schmidt. Passages are provided through the valve plug to allow static fluid pressure to pass through the valve plug to an upper chamber. The lower end of the valve plug is configured to create a negative pressure at the lower end of the plug as the valve is being opened which draws fluid from the upper chamber thereby reducing the pressure inside the valve plug and upper chamber.

DISCLOSURE OF INVENTION

In accordance with the present invention lightning protected condensate drain valve is provided which is "human error proof" and allows standard push to drain operations without requiring close proximity of the operator or serviceman to the valve, i.e., allows so-called "pogo" draining from the ground.

To this end of valve herein proposed includes a special channel to permit and direct the flow of air pressure internally of the valve mechanism where a piston head is provided to receive and react to such air pressure to maintain the valve in the closed position. Thus, the instant condensate drain valve employes the blast pressure associated with a lightning strike which normally drives standard valves open to allow arcing inside side the fuel tank to assure that the valve remains mains closed.

This is in sharp contrast to the standard push to drain condensate drain valve wherein the only force available to prevent the valve from opening against the blast pressure accompanying a lightning strike is a spring. To provide a spring with sufficient force to overcome the blast pressure is not feasible. Nor is it desirable to provide a physical lock to secure the valve in the closed position. Failure to actuate such a lock following tank draining leaves the valve in the same condition as a standard valve, i.e. without lightning protection.

More specifically, the valve herein proposed comprises essentially a housing connectable to and disposed within the fuel tank in a stationary relative position. Centrally within this housing is a removable and replaceable seat in which a piston is mounted for reciprocation. At its other or inner end the piston is mounted for reciprocation in a spring-loaded cylinder operative to force the cylinder and piston outwardly of the valve seat and housing. The piston is provided with a central passage which is tapered so that the surface of the piston is larger proximate its inner end than at its outer face. Air pressure entering this central passage reacts against the larger piston surface and adjacent cylinder wall to thereby force the piston outward.

BRIEF DESCRIPTION OF THE DRAWINGS

With the above and other objects in view as will be apparent this invention consists in the arrangement, construction and combination of parts all as hereinafter more fully described, claimed and illustrated in the drawings, wherein:

FIG. 3 is a similar section of the valve assembly as installed in FIG. 1 and showing the change in position of some of the movable elements during a lightning strike blast pressure condition; and FIG. 4 is a similar section with some of the valve elements removed for seal replacement with the valve being maintained in the closed position.

Figure 2:
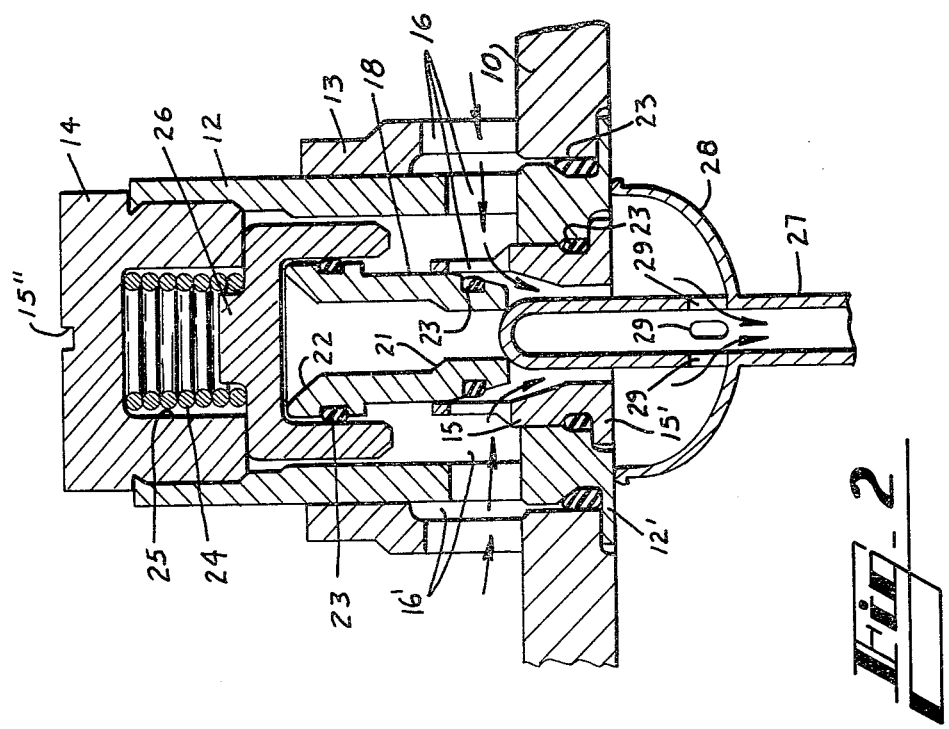
FIG. 2 is a similar section with the addition of a drain tool associated therewith whereby the valve is opened allowing the tank to be drained.

DETAILED DESCRIPTION AND PREFERRED EMBODIMENT of Invention

Referring more particularly to the drawings 10 designates the wall of a fuel tank, such as contained in a component of an aircraft, in the area of a drain opening 11. A hollow bolt or valve housing 12 is inserted through the opening 11 and a nut 13 is then threaded onto the end of the valve housing 12 from the interior of the tank and tightened to sandwich the tank wall 10 between the nut 13 and the head 12' of the valve housing 12. At this time the surface of the head 12' lies in the plane of the outer surface of the wall 10.

If desired, as an alternative the nut 13 may be secured in any suitable manner to the inner side of the tank wall 10 so as to be immovable therewith and align with the opening 11. This alternative structure allows the valve housing 12 to be removed and replaced entirely from the exterior of the tank 10. At its inner end the housing 12 is threaded internally to receive a bolt or externally threaded cap 14. At its outer end the housing 12 is similarly threaded to receive an externally threaded tubular bolt or valve seat 15 having a head 15' disposed in the plane of the outer surfaces of head 12' and wall 10 when fully tightened therein. Cap 14 and valve seat 15 are each provided with a keyway or slot 15" respectively to facilitate the assembly as described and the side walls of the nut 13, housing 12 and seat 15 are pierced by openings or ports 16 are in communication at this time due to their alignment and/or gaps 16' provided to assure this.

Internally of the housing 12 in the space defined by the housing 12 between the cap 14 and the head 12' is a cylinder 17 and piston 18. The cylinder 17 is cup shaped, opening outwardly toward the seat head 15' and having an internal diameter greater than the inner end of the seat 15 so that it may reciprocate around it. The piston 18 is sized so as to seat within the cylinder 17 at one end and to slide within the inwardly extending neck of the seat 15 at its other or outer end. It tapers as at 19 at this outer end so as to conform to the inner surface of the seat 15.

Internally the piston 18 has a passage 20 extending the length thereof and its inner surface is tapered at least in part as for example by a step 21 medially of its length and another step 22 at its inner extremity. Seals such as for example O-rings 23 are provided in grooves in the peripheral wall of the piston 18 in keeping with conventional practice. Similar seals 23 are also provided between the surfaces of the housing 12 and wall 10 as well as between the housing 12 and seat 15.

A compression spring 24 is provided between the cylinder 17 and the cap 14 being seated in a well 25 formed or otherwise produced in the adjacent end of the cap 14. A projection lug 26 or the equivalent extends from the base of the cylinder facing the cap 14 to serve as a guide for positioning the spring 24.

OPERATION OF THE PREFERRED EMBODIMENT

Figure 1:
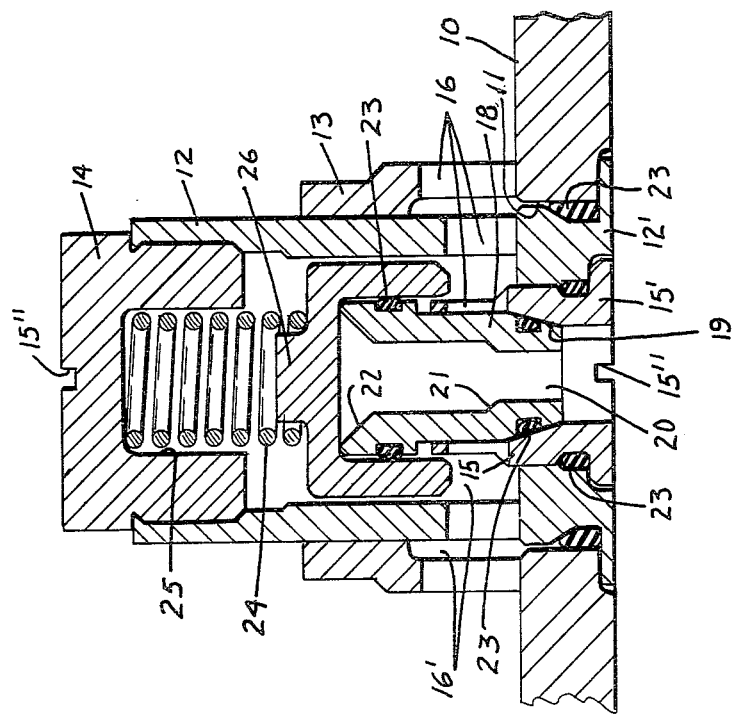
FIG. 1 is a section taken through a fuel tank in the area of a condensate drain valve designed and constructed in accordance with this invention as it would be installed therein to show the several elements which comprise the valve assembly in their normal position with the valve closed.

With the valve assembly installed as above described the several elements thereof are normally located in the position shown in FIG. 1. The piston 18 is located with its tapered end 19 in abutment against the complemental surface of the seat 15 and its side wall closing the ports 16. The valve is thus closed and liquid is retained inside the tank 10, the spring 24 acting on and against the cylinder 17 and piston 18 being responsible to secure the valve closed.

When it is desired to drain the tank 10 of liquid an appropriate tool such as the rounded end probe 27 (FIG. 2) is employed. The piston 18 is thereby forced inwardly of the valve assembly against the action of the spring 24 opening the ports 16. This allows liquid to flow from the tank 10 through the seat 15, into the funnel like container 28 associated with the tool 27. As envisioned hereby the probe 27 is tubular with openings 29 provided therein at the base of the container 28 so that the liquid passes through the probe 27 and may be collected in a glass bottle or the like. When all of the water in the liquid has been thus collected and fuel starts to be seen in the bottle, the probe 27 may be removed. The piston 18 then returns to its original position by the action of the spring 24 and the valve assembly is closed.

It is to be noted that the piston 18 and cylinder 17 remain in the same position relative to each other during the above operations and conditions, as illustrated in FIGS. 1 and 2. These are considered as the normal operations or static conditions.

FIG. 3 shows the position of the valve assembly elements as they would be when subjected to the blast pressure which might accompany a lightning strike. In this case the spring 24 is compressed and the cylinder 17 is forced inward (raised upward) by the pressure blast. The piston 18, however, remains in its seated position, with its tapered end 19 abutting the surface of the seat 15, by the blast pressure acting on the larger upper piston area defined by the steps 21 and 22 and the top of the piston 18. In this position the piston 18 blocks the ports 16 and the seals 23 associated with the piston 18 remain in contact with the adjacent surfaces of the cylinder 17 and seat 15 preventing fuel leakage as well as lightning from entering the tank 10.

FIG. 4 shows the valve assembly with the seat 15 removed by unthreading it from the housing 12 and allowing the piston 18 to drop or be withdrawn. This permits the O-rings 23 to be removed and replaced as well as replacement of the seat 15 and piston 18 if desired. During this operation the cylinder 17 is lowered by extension of the spring 24 to a position where it abuts the housing head 12' blocking the ports 16 and providing a seal to prevent liquid leakage from the tank 10.

I claim:
1. A drain valve assembly for a fuel tank comprising:
a housing secured to a wall of said tank and disposed internally of said tank;
an opening in a wall of said housing for the flow of liquid in said tank therethrough;

a cylinder slidably mounted in said housing and under a force normally tending to position it whereby it overlies and blocks said housing opening; and a piston slidably mounted in said cylinder, said piston being defined at its end inwardly of said tank by a surface having an area substantially greater than the area of the surface at its outer end and located between said cylinder and said housing to resist said normal force and to overlie and block said housing opening, said piston having a longitudinal passage extending therethrough allowing pressure externally of said tank to act on and against the interior of said cylinder and said greater area piston surface to maintain said cylinder out of the overlying and blocking position, and simultaneously to move said piston to the overlying and blocking position and an overpowering force on the outer end of said piston is required to move it relative to said cylinder so as to maintain said cylinder and said piston out of its position of overlying and blocking said housing opening as aforesaid.

2. The valve assembly of claim 1 wherein said housing includes a removable and replaceable valve seat for mating coaction with said outer piston end, said piston being removable through said wall opening upon removal of said valve seat whereby said cylinder is disposed in the position overlying and blocking said housing opening under said normal force.

3. The valve assembly of claim 1 wherein said longitudinal piston passage is tapered to form the substantially greater piston surface area aforesaid.

4. The valve assembly of claim 1 wherein said substantially greater piston surface area is formed by at least one step along said longitudinal passage and the inner end of said piston.

5. The valve assembly of claim 1 wherein the outer surface of said housing is disposed in the plane of the outer surface of said tank wall.

6. The valve assembly of claim 1 wherein said cylinder is spring-loaded to produce the normal force.

* * * * *